Aug. 4, 1925.
J. G. UTZ ET AL
1,548,072
BUMPER
Filed May 22, 1922
2 Sheets-Sheet 1
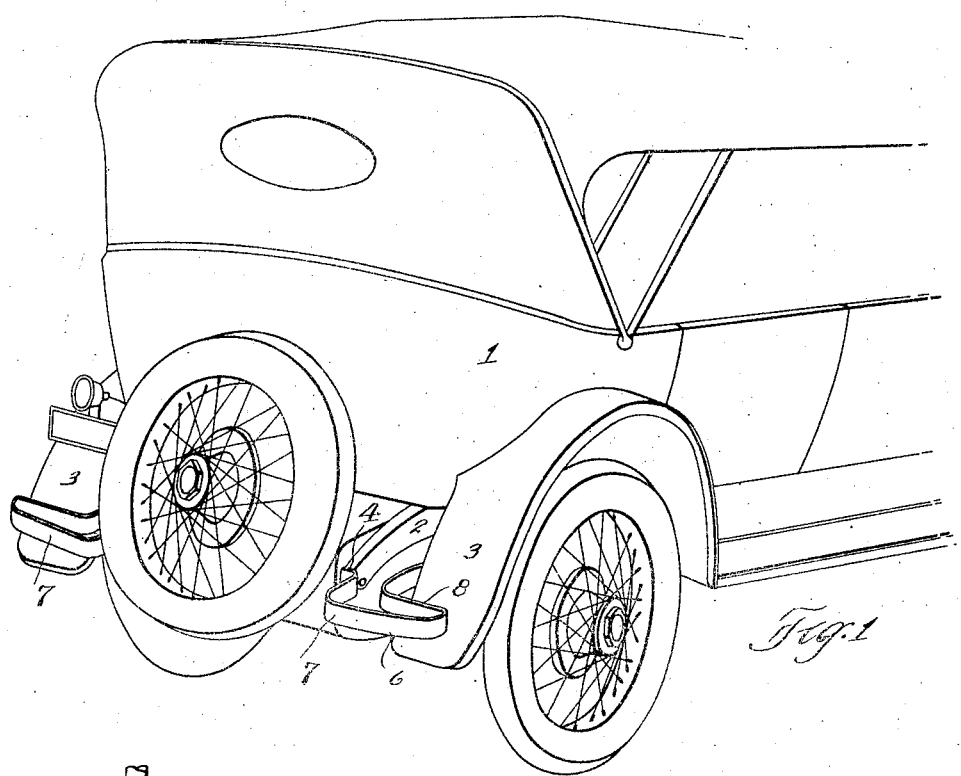
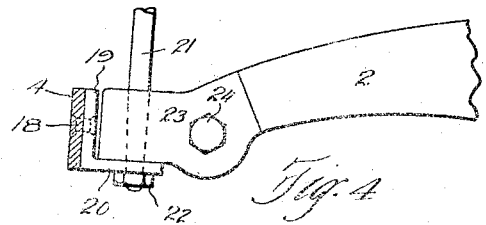
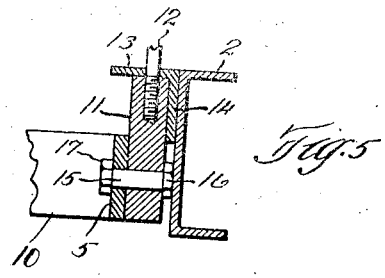
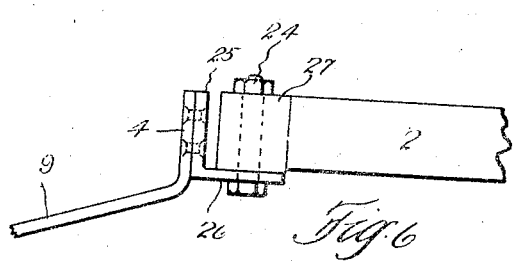
Inventors
John G. Utz, Bladen M. Short,
BY Hull, Brock & West
Attys.

Aug. 4, 1925.
J. G. UTZ ET AL
1,548,072
BUMPER
Filed May 22, 1922
2 Sheets-Sheet 2
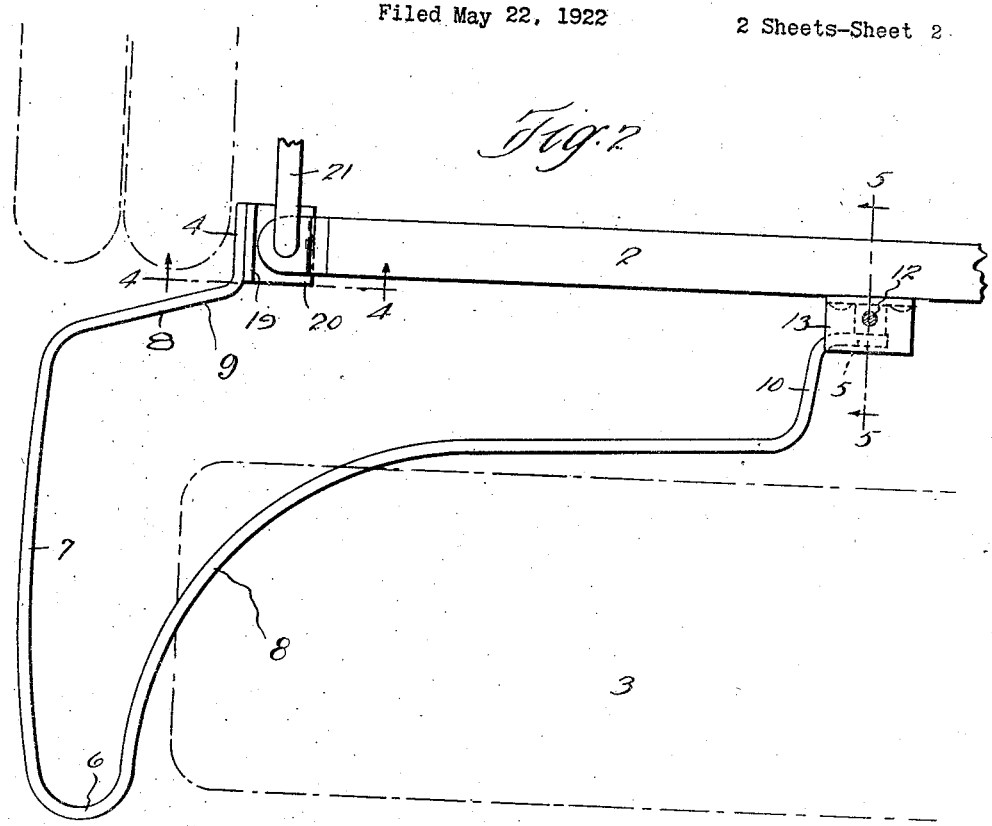
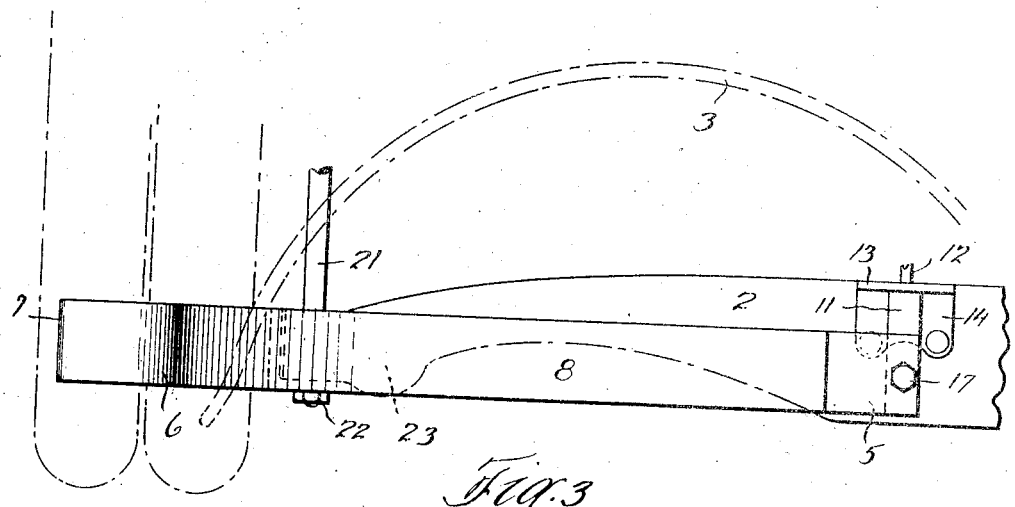

Patented Aug. 4, 1925.

1,548,072

UNITED STATES PATENT OFFICE.

JOHN G. UTZ AND BLADEN M. SHORT, OF DETROIT, MICHIGAN, ASSIGNORS, BY MESNE ASSIGNMENTS, TO THE C. G. SPRING & BUMPER COMPANY, OF DETROIT, MICHIGAN, A CORPORATION OF DELAWARE.

BUMPER.

Application filed May 22, 1922. Serial No. 562,890.

*To all whom it may concern:*

Be it known that we, JOHN G. UTZ and BLADEN M. SHORT, citizens of the United States, residing at Detroit, in the county of Wayne and State of Michigan, have invented a certain new and useful Improvement in Bumpers, of which the following is a full, clear, and exact description, reference being had to the accompanying drawings.

This invention relates to automobile bumpers and more particularly to bumpers or protectors for the fenders of such vehicles.

It is the general purpose and object of the invention to provide a bumper of this type which is comparatively cheap of production but which will accomplish efficiently the purposes for which it is designed; also to provide for bumpers or protectors of this character a simple, economical, and efficient means for mounting or supporting the same.

We accomplish these objects in and through the construction and arrangement of parts shown in the accompanying drawings, wherein Fig. 1 represents a perspective view of the rear portion of an automobile having our invention applied thereto; Fig. 2 a detail in plan of the invention and the manner of mounting the same, the co-operating parts of the vehicle being shown in dot-and-dash lines; Fig. 3 a detail in side elevation of the parts shown in Fig. 2; Fig. 4 a sectional elevation showing the manner of mounting the rear end of each bumper or protector; Fig. 5 a detail in section corresponding to the line 5—5 of Fig. 2; and Fig. 6 a detail in plan of a modification of the rear support for each bumper, showing the manner in which such bumper or protector may be supported by the rear ends of ordinary side frames.

Describing the various parts by reference characters, 1 denotes the rear portion of an automobile having the ordinary channeled side members 2, and 3 denotes the rear fenders of the vehicle.

Instead of using a single rear bumper adapted to be attached at its opposite ends to the rear ends of the side members 2 and to extend entirely across the rear of the automobile and in protecting relation to the fenders, we provide a special bumper or protector for each side of the rear of the car, each bumper or protector extending rearwardly and outwardly so as to protect from impact the fender with which it cooperates. For each such bumper or protector, we preferably employ a flat spring plate having a rear attaching end 4, a front attaching end 5, and a body connecting said ends which is so shaped as to provide an outwardly extending loop 6 effectively covering the adjacent portion of the rear fender. Each loop 6 is formed between portions 7 and 8 of the spring plate, the former portion extending transversely of the vehicle and connected by an inclined portion 9 with the rear attaching portion 4, the opposite portion 8 of the loop being forwardly curved and connected at its front end with the front connecting portion 5 by an inwardly directed portion 10. In the embodiment of our invention disclosed herein, each front attaching portion 5 is secured to a special elongated nut 11 which receives the lower end of a body bolt 12 extending through the upper flange 13 of an angle brace the vertical flange 14 of which is secured to its corresponding side member 2. The outer face of each nut 11 is flat, to provide a bearing surface for the inner attaching portion 5 of its protector or bumper, which attaching portion may be conveniently connected to said nut by means of a bolt 15 having a head 16 interposed between the web of the side member 2 and the nut, the head being preferably the same thickness as the flange 14. To the outer end of each bolt 15 a nut 17 is applied. The rear end of each bumper or protector is secured, as by one or more rivets 18, to the vertical flange 19 of an angle clip the lower flange 20 of which is mounted upon the lower end of the tire carrier rod 21, said rod having a nut 22 at its lower end by which the flange 20 of the angle clip may be held to a flat seat against the underside of a bracket 23 constituting the rear end of each of the members 2 and each supporting the spring bolt 24.

Where no special bracket 23 is provided, we may mount the rear end of each bumper or protector upon the transversely extending flange 25 of an angle clip the forwardly extending flange 26 of which is secured to the side of the mounting 27 for the rear end of the spring by means of the spring bolt 24.

By the construction shown and described, we have produced a bumper or protector which can be produced cheaply and which can be used in duplication upon the end of an automobile and which, when installed, will protect the fenders in an efficient manner. This efficient protection is enhanced by the particular shape given to each bumper, it being noted that each bumper has the portion 7 which extends transversely across the adjacent end of the fender and which portion is connected by the loop 6 with a long inwardly and forwardly extending portion 8 which serves as a brace or strut for the portion 7, the parts thus cooperating to withstand severe blows without injury to the fender and without permanent injury to the bumper. Furthermore, in conjunction with the tire carrier and spare tires usually provided, a pair of these bumpers or protectors will constitute efficient protection for the entire rear end of an automobile. The bumpers or protectors may be readily and quickly installed in place upon the side frames and at a minimum cost for fittings and connections.

Having thus described our invention, what we claim is:

1. The combination, with a side member of an automobile, of a bumper having one end extending across and secured to the end of said side member and having its opposite end extending substantially parallel with and secured to the said side member and having an intermediate portion projecting outwardly in position to protect a fender.

2. The combination, with a side member of an automobile, of a bumper having one end secured to the end portion of said side member and having its opposite end extending substantially parallel with and secured to the said side member and having an intermediate portion projecting outwardly in position to protect a fender.

3. A bumper or protector for the fenders of automobiles comprising a bar bent to form an outwardly projecting loop spaced from the adjacent end of the fender with which it cooperates and having an inwardly transversely extending portion adapted to be secured to the end portion of the cooperating side member and a portion extending generally longitudinally of the vehicle and adapted to be secured to a part of such side member longitudinally spaced from the end thereof.

4. A bumper or protector for the fenders of automobiles comprising a bar bent to form an outwardly projecting loop spaced from the adjacent end of the fender with which it cooperates and having an inwardly transversely extending portion terminating in an attaching portion adapted to be secured to the end portion of the cooperating side member or frame and also having an inwardly and longitudinally extending portion terminating in an attaching portion longitudinally spaced from the first mentioned attaching portion and adapted to be secured to such side member or frame.

5. The combination, with a side member and a fender of an automobile, of an angle clip secured to said member, an elongated nut beneath said clip for the reception of a body bolt, and a bumper or protector having one end bearing against and connected to said nut and having its opposite end secured to the end of said member and provided with an intermediate portion extending across and protecting the fender.

6. The combination, with a side member and a fender of an automobile, of an elongated nut carried by said member for the reception of a body bolt, and a bumper or protector having one end bearing against and connected to said nut and having its opposite end secured to the end of said frame or member and provided with an intermediate portion extending across and protecting the fender.

7. The combination, with a side member and a fender of an automobile, of a spring supporting bracket carried by and projecting beyond an end of said member and having a seat on the under side thereof, an angle clip having a substantially horizontal flange adapted to engage said seat and also having a vertical flange, means securing the horizontal flange to the said bracket against the seat thereon, and a bumper or protector having one end secured to the other flange of said clip and having an intermediate portion adapted to project out beyond the fender and having its opposite end secured to the said side member.

8. The combination, with a side member and a fender of an automobile, of a bracket carried by an end of said member and having a seat thereon, an angle clip, means securing one of the flanges of the angle clip to the said seat, and a bumper or protector having one end secured to the other flange of said clip and having an intermediate portion adapted to project out beyond the fender and having its opposite end secured to the said side member.

9. The combination, with a side member of an automobile, of an angle clip applied to one end of said member, and a bumper having one end secured to said clip and having an intermediate portion projecting outwardly in position to protect a fender and having its opposite end secured to the said side member.

10. The combination, with a side member of an automobile having a bracket secured to the end thereof, said bracket having a seat on its under side, of an angle clip having one flange bearing against said seat, a tire-supporting rod extending through said bracket and said clip, and a bumper having one end secured to the other flange of said clip and its opposite end secured to said member, said bumper having an intermediate portion adapted to project across a fender.

11. The combination, with the rear portion of the frame and a fender of an automobile, of a bumper comprising a continuous bar of metal having one end connected to a portion of said frame and extending rearwardly from such point of attachment and then outwardly substantially across the said fender and then inwardly toward said frame, thereby forming a resilient loop at the rear of said fender, the second end of the said bar being secured to the said frame at a point longitudinally spaced from and in advance of the point of attachment of the first mentioned end.

12. The combination, with the rear portion of the frame and a fender of an automobile, of a bumper comprising a continuous bar of metal having one end connected to a portion of said frame and extending rearwardly from such point of attachment and then outwardly substantially across the said fender and then inwardly toward said frame, thereby forming a resilient loop at the rear of said fender, the other end of the bar extending at right angles to the first mentioned end and being also connected to the said frame.

13. The combination, with the rear portion of the frame and a fender of an automobile, of a bumper comprising a continuous bar of metal having one end connected to a portion of said frame and extending rearwardly from such point of attachment and then outwardly substantially across the said fender and then inwardly toward said frame, thereby forming a resilient loop at the rear of said fender, the other end of the bar extending at right angles to the first mentioned end and being connected to the said frame at a point longitudinally spaced from the point of connection of the first mentioned end.

14. The combination, with the rear portion of the frame and a fender of an automobile, of a bumper comprising a resilient loop extending substantially across the said fender and having ends arranged substantially at right angles to each other, and means for securing said ends to the said frame.

15. The combination, with the rear portion of the frame and a fender of an automobile, of a bumper comprising a resilient loop extending substantially across the said fender and having ends arranged substantially at right angles to each other, the said ends being longitudinally spaced, and means for securing the ends to longitudinally spaced portions of said frame.

In testimony whereof, we hereunto affix our signatures.

JOHN G. UTZ.
BLADEN M. SHORT.